Aug. 9, 1960 W. T. RENTSCHLER 2,948,205
INTRA LENS SHUTTER
Filed Nov. 12, 1952 3 Sheets-Sheet 1

INVENTOR.
WALDEMAR T. RENTSCHLER
BY
Attorneys

Aug. 9, 1960　　　W. T. RENTSCHLER　　　2,948,205
INTRA LENS SHUTTER
Filed Nov. 12, 1952　　　　　　　　　　　　3 Sheets-Sheet 2
Fig. 2.
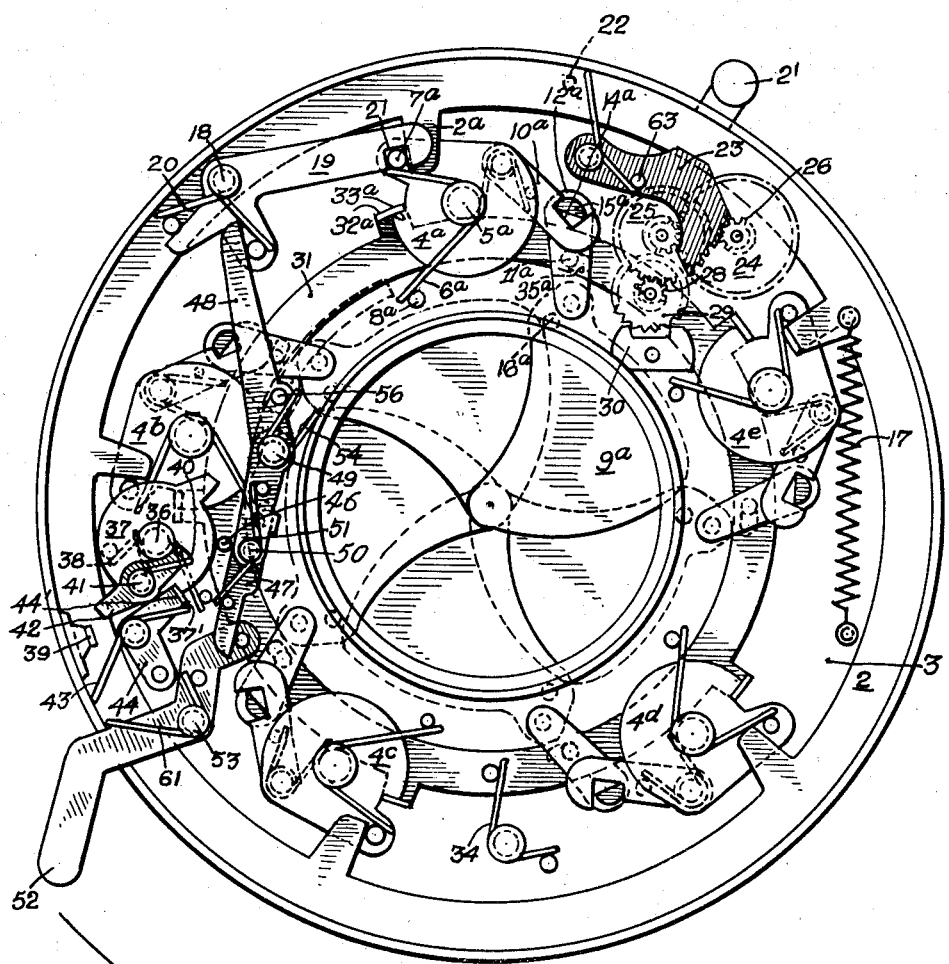
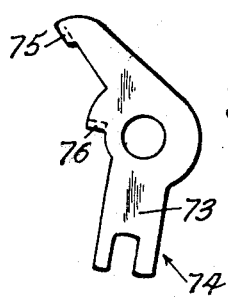
Fig. 6.
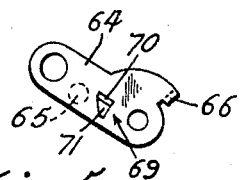
Fig. 5.
INVENTOR.
WALDEMAR T. RENTSCHLER
BY
Munn, Liddy & Nathanson
Attorneys

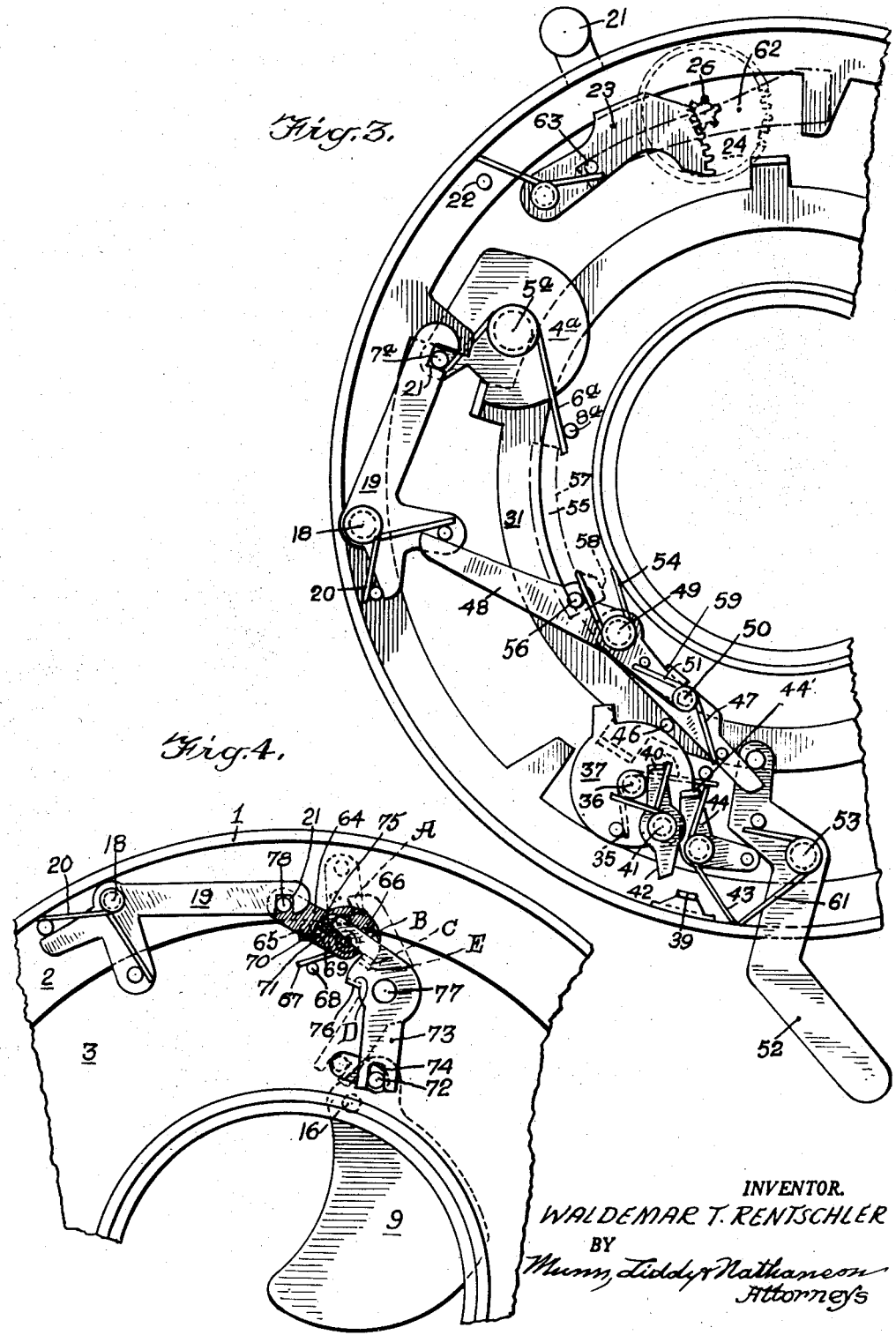

United States Patent Office 2,948,205
Patented Aug. 9, 1960

2,948,205

INTRA LENS SHUTTER

Waldemar Traugott Rentschler, Calmbach (Enz), Germany, assignor to Alfred Gauthier G.m.b.H., Calmbach (Enz), Germany, a corporation of Germany Filed Nov. 12, 1952, Ser. No. 319,880

Claims priority, application Germany Dec. 15, 1951

8 Claims. (Cl. 95—63)

This invention relates to photographic intra-lens shutters of the type provided with several shutter blades. More particularly, the invention concerns a novel intra-lens shutter wherein each shutter blades is provided with its own independent power source assembly for the opening and closing of its respective shutter blade.

In presently known photographic intra-lens shutters, all of the shutter blades are actuated together by means of a shutter blade ring which is propelled by a single spring. Thus, the spring has a relatively large inert mass which it must move to open the shutter. This naturally results in a limitation of the possible shutter speed.

The present invention provides a photographic intra-lens shutter wherein each shutter blade is associated with its own individual drive assembly, so that the inert mass to be moved by each spring is a minimum. The invention further consists in the provision of a connection between individual shutter blades, so that these shutter blades may be operated when connected together as a unit, as well as individually when their power sources are not associated with one another.

The invention also provides a novel photographic intra-lens shutter with which very high shutter speeds are possible.

A separate coil spring associated with a spring housing is provided for each shutter blade. A single cocking ring provided with cams acts on each of the spring housings so as to cock them. The housings are held in this set or cocked position by a holding ring which is concentric with the shutter opening. Releasing of this holding ring provides an exactly synchronized releasing of the individual spring housings to open the shutter. An additional special spring housing is provided for the holding ring and this also is brought into set position by the cocking ring, additional means being provided to hold it in cocked position.

Means is also provided to connect the cocking ring with one of the power sources by means of a coupling device for coupling or uncoupling these elements so that it will be possible to allow each individual spring housing to operate independently of the others or to arrange them to operate while associated with each other through the medium of this coupling and the cocking ring. As a result of this arrangement, the shutter can be operated at either top speed, that is, when each housing operates independently; or at a speed less than top speed, that is, when the individual housings are associated through the coupling and cocking ring. Where top speed is desired, the inert mass to be accelerated by one of the power sources should be a minimum. Thus, top speed results when each power source and its housing operate independently of the others.

Besides providing a very short effective exposure time, this means of operation results in an extremely good shutter efficiency. In this case the cocking ring lever is returned to its rest position before releasing of the shutter blades is effected. Where less than top speed is desired, the coupling between the cocking ring and one of the power sources is retained after actuation of the shutter release lever. Thereby, the individual shutter blades may be brought into fixed relation with each other, and, in addition, it is possible to obtain a certain open time of the shutter by means of the cooperation of the cocking ring with some type of gear escapement known in the art. Means is provided on the shutter speed adjusting ring to selectively control the operation of the means for disengaging the coupling device so that the latter may or may not be disengaged.

These and other advantages of the present invention will become more apparent as it is described more fully below in relation to the accompanying drawings wherein Fig. 1 is a top view of the mechanisms of the novel shutter with its cover plate removed and all unessential parts omitted, and with the shutter in the rest position and adjusted for speed different from top speed.

Fig. 2 is a view similar to Fig. 1, but with the shutter set to operate at top speed.

Fig. 3 is an enlarged fragmentary view of part of the shutter of Figs. 1 and 2.

Fig. 4 shows a modified bearing arrangement for the shutter blades and a modified power transmission system between the power sources and the blades.

Fig. 5 is a plan view of a rotary driving member constituting a portion of the transmission means of Fig. 4.

Fig. 6 is a plan view of a driven bell crank or two-armed lever constituting part of the transmission shown in Fig. 4.

Figure 1:
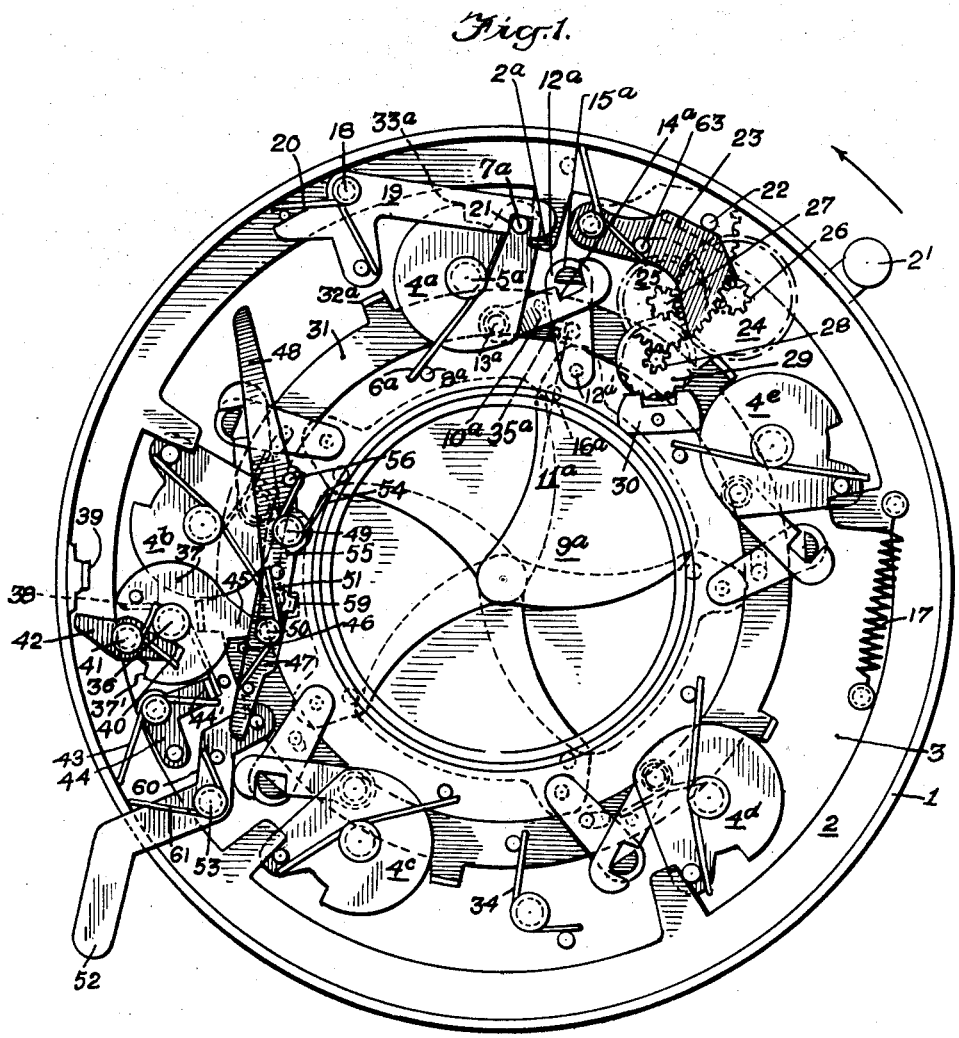

The drawings show the shutter housing 1 with the shutter cocking ring 2 rotatably mounted within it and having a handle 2' set in front of the base plate 3 (as seen in Fig. 1). These elements surround the shutter, composed in this case of five blades 9a and 9e. Since the independent power and transmission or actuating means for blades 9a to 9e are identical, the invention will be described in detail for the most part with reference to only one of these means; that is, the one which is associated with blades 9a. Likewise, reference characters, for the most part, are shown only for the "a" assembly in the drawings to prevent confusion. Referring to the power unit assembly having the letter "a" after the reference numerals in the drawing, a spring housing 4a in the form of a rotary member is pivotally mounted around its bearing pin 5a on the base plate 3. The remaining power units are spaced from housing 4a at equal intervals around a circle concentric to the shutter housing. Each spring housing is under the separate influence of its respective spring. Thus, spring housing 4a is influenced by motor spring 6a, one end of which engages pin 7a fixed on the spring housing and the other end lies against pin 8a fixed on the base plate 3.

Spring housing 4a is linked to shutter blade 9a by means of a pusher pawl 10a and a lever 12a pivoted on the housing 1 intermediate its ends on a pin 11a thereby dividing it into two oppositely extending lever arms. Pusher pawl 10a is pivotally mounted on crank or pivot pin 13a fixed on spring housing 4a and is provided with a notch 14a by which it can engage pin 15a which is semi-circular in cross-section and fixed on an arm of lever 12a. The pusher pawl 10a is under the influence of a coil spring arranged around pivot 13a, the spring forcing this pawl into engagement with the pin 15a. On the other arm of lever 12a, pin 12a' is arranged for actuating the shutter blade 9a.

The shutter blade 9a is pivotally mounted near its outer rim about a pin 16a fixed on base plate 3. The five pins 16a to 16e are arranged on a circle concentric to the shutter opening and located on a radius only slightly greater than that of the shutter opening.

Shutter cocking ring 2 is provided with cam arms 2a to 2e arranged to engage respectively pins 7a to 7e on the spring housings. Spring 17 exerts on the cocking ring 2 a pull in clockwise direction. Cocking ring 2 is also provided with a pawl 19 pivoted at 18 and under the influence of spring 20. This pawl is provided with a notch 21 by which it may engage with a pin 7a. Another pin 22 is fixed on the cocking ring and provides a means by which the cocking ring may be influenced by an escapement mechanism consisting of segment 23, gears 24 and 25, pinions 26 to 28, pallet wheel 29 and pallet 30. By this latter means the exposure time may be controlled.

Referring now more particularly to Figure 3, it shows the mechanism for disengaging the pawl 19 from ring 2 and spring housing 4a. This disengagement is effected by means of levers 47 and 48 which are pivoted around a common pivot 49. A spring 51 is arranged around pin 50 on lever 48, one end of the spring resting against a pin on the lever 47 and the other end against a pin on the lever 48. By actuating the shutter release lever 52, pivoted at 53, lever 47 will be turned by pin 52' on lever 52 in a clockwise direction. Lever 48 will also be turned in a clockwise direction by virtue of the interengagement of the two levers through the medium of spring 51. A control notch 55, the outline of which is indicated in broken lines in Figure 3, is provided in the shutter speed adjusting ring (not shown). A spring 54 is arranged around pivot 49 so as to force lever 48 against the exterior limit of the control notch 55. If spring 54 is overcome by the effect of the clockwise turning moment exerted on lever 48 through spring 51, the lever 48 will follow this moment so long as pin 56 of this lever lies opposite the surface 58 of notch 55 and is not supported by surface 57.

The holding ring 31 has arms 32a to 32e for holding in set position the spring housings 4a to 4e. Rectangular bent up lugs on the ends of arms 32a to 32e fall behind noses 33a to 33e of the housings to hold them. A spring 34 pulls ring 31 in a clockwise direction. The ring 31 also is provided with slots 35a to 35e which permit some movement of pivots 11a to 11e, respectively.

A special spring housing 37, pivotally mounted on pin 36 on base plate 3, is provided for releasing the holding ring 31. The spring 38 which actuates this housing is set by means of a cam or lug 39 attached to the cocking ring 2. This cam engages a lever 42 pivotally mounted on pin 41 on housing 37. Lever 42 is normally urged in a counterclockwise direction by spring 40, which is arranged to be set prior to the time spring 6a is set. This special spring housing 37 is retained in set position by means of a locking lever 44 which is urged in the locking direction by spring 43. The housing is further provided with a cam 45, disposed so as to engage pin 46 fixed in the ring 31. By virtue of this engagement the ring 31 can be turned in a counter-clockwise direction so as to release the main spring housings.

A bent off arm 59 is provided on lever 48 for holding it in engagement with lever 47. As can be seen from Figure 3, when lever 48 turns in a clockwise direction it will turn pawl 19 against the action of spring 20 in a counter clockwise direction, and thus effect the release of the connection between cocking ring 2 and housing 4a. The disengagement of this linkage 21 and 7a is effected before the release of the spring housing 37. Spring housing 37 is released when the control edge of releasing lever 52 engages a pin on locking lever 44, which is normally urged in the locking direction by spring 43. Shutter release lever 52 is provided with a return spring 61. There is also provided in the shutter speed adjusting ring (not shown) a control slot 62, the outline of which is indicated in broken lines in Figure 3. This slot controls the operation of the escapement mechanism through the medium of pin 63.

Operation

In order to set the shutter the cocking ring 2 is moved in the direction of the arrow in Fig. 1 and the spring housings 4a to 4e are thereby turned in a counterclockwise direction by means of the engagement of lugs 2a to 2e with pins 7a to 7e on the housings at the same time the cam or lug 39 engages the lever 42 mounted on spring housing 37 and thereby turns the housing in a counterclockwise direction so as to set spring 38. After the cocking ring has been moved a certain distance the locking lever 44 with its bent up lug 44' lies behind nose 37' of housing 37 and holds this spring housing in set position.

Ring 2 must be moved a further distance in the same direction to completely set springs 6a to 6e. When this has been done bent up arms 32a to 32e of holding ring 31 lie behind noses 33a to 33e of the housing 4a—4e and hold them in set position. This operation takes place regardless of whether the shutter speed adjusting ring is set to top speed or a speed different from top speed. The housings are shown in set position in Fig. 2.

Figs. 2 and 3 show the shutter in set position when the shutter speed adjusting ring is set to top speed. To operate the shutter from this initial position, the shutter release lever 52 is actuated in the direction of the arrow shown in Fig. 2. The pawl 19 is disengaged from pin 7a of housing 4a by means of levers 47 and 48. This disengagement can be effected because pin 56 on lever 48 is opposite the smooth surface 58 of control slot 55 of the shutter speed adjusting ring and thus lever 48 can be moved in a clockwise direction.

When the shutter is thus adjusted to top speed, segment 23 is held out of the path of pin 22 on cocking ring 2 by means of pin 63 on segment 23. This pin 63 is controlled by a control slot 62 in the shutter speed adjusting ring. After the connection 21 and 7a is disengaged, cocking ring 2 is returned to rest position by spring 17. Because of the special shape of release lever 52 actuation of locking lever 44 by lever 52 takes place only after disengagement of pawl 19. When lever 44 is engaged housing 37 is released and cam 45 of this housing engages pin 46 on the holding ring 31 and moves it in a counterclockwise direction. This releases housings 4a to 4e and thereby swings shutter blades 9a to 9e to and fro or open and shut by means of members 10a to 10e and 12a to 12e, the crank pins 13a etc., passing through their dead center positions to reverse the blades during such operation or exposure.

It should be noted here that where the shutter is adjusted to top speed each of the individual power sources and transmission means acts entirely independently of the others since cocking ring 2 is returned to rest position prior to the release of housings 4a to 4e. Therefore, the inert mass to be accelerated by each power source and transmission means is a minimum and thereby optimum for acceleration.

The time interval between the release of pawl 19 and the beginning of the movements of the housings 4a to 4e is so large, due to the intermediate operation, that cocking ring 2 may return completely to rest position. Thus, the turning of the spring housings in clockwise direction can take place without any escapement mechanism, and the mass of the respective power transmission members and shutter blade can be accelerated to high speed within a very short time. The releasing of the housings 4a to 4e by means of holding ring 31 and spring housing 37 guarantees an exact and equal synchronization of the releasing moments for the spring housings for every exposure. Furthermore the housing 4a reengages with notch 21 of pawl 19 by means of its pin 7a at the end of the turning movement in a clockwise direction.

Next to be considered is the case where the shutter speed adjusting ring is set to an exposure time different from top speed. In this case pin 56 on lever 48 is supported by the smooth engagement surface 57 of control slot 55 of the shutter speed adjusting ring. When this condition exists, actuation of release lever 52 in the direction of the arrow of Fig. 2 does not influence lever 48; that is, the connection between cocking ring 2 and housing 4a is not disengaged. When holding ring 31 has been released in the manner described above, the movements of the individual spring housings are no longer independent of each other, but a coupling of the turning movements of the same takes place through cocking ring 2. The spring housings lie against lugs 2a to 2e with their pins 7a to 7e to produce a connection between the spring housings and cocking ring 2 and control the movement of the shutter blades by acting against a single counterforce on cocking ring 2. This counterforce is caused by the action of escapement mechanism 23 to 30 against pin 22 of the shutter cocking ring 2.

The coupling of spring housings 4a to 4e by cocking ring 2 makes the effects of the independent power sources depend on one another. The acceleration in this case is reduced since the magnitude of the inert mass to be accelerated has increased.

Before shutter cocking ring 2 reaches rest position lug 39 on the ring engages lever 42 on housing 37 and turns it clockwise. Thereby cocking ring 2 may again take the rest position shown in Fig. 1.

Fig. 4 shows a modified transmission means or system for the transmission of power from the power sources to the shutter blades. A spring power member or housing 64 (also termed a rotary member) corresponding to housing 4a is associated with a motor spring 67 corresponding to spring 6a. One side of spring 67 lies against pin 65 on the housing 64 and the other side lies against a pin 68 fixed in the base plate. A driving lug or stop 69 is fixed on housing 64 and has a surface 70 parallel to the plane of the base plate and a second, sloped surface 71. Housing 64 is also provided with a rectangularly bent up driving lug 66. Shutter blade 9a is pivoted at 16 on the base plate and is provided with a pin 72 which engages with the forked end 74 of a two armed lever or bell crank 73 which is pivoted at 77 on the base plate. A rectangularly bent up driven lug 75 is provided at one end of lever 73 and an additional bent up driven lug 76 is provided on the circumference of lever 73. The connection between pawl 19 and housing 64 is completed by latching the pawl on pin 78 of housing 64.

Fig. 4 shows the housing in set position wherein stop 69 is directly opposite lug 75. The blocking or holding means of Fig. 2 are omitted for the purpose of clarity. If spring housing 64 is released so as to move in a clockwise direction, two armed lever 73 is also moved clockwise by driving lug or stop 69 and driven lug 75 and shutter blade 9 is swung out of the shutter opening. When driven lug 75 reaches position A it is left by the lug or stop 69, and bent up driving lug 66, which has meanwhile moved from position B to position C, engages with driven lug 76, which has moved from position D to position E. As a result, two armed lever 73 is turned in the opposite direction (counterclockwise) and shutter blade 9 reverses and enters the shutter opening so as to close the shutter. During the setting of the spring housing by means of cocking ring 2 bent up lug 75 of lever 73 slides over the sloped surface 71 of stop 69 and finally falls behind stop 69 after passing surface 70. Thus, the parts are again in the position shown in Fig. 4. This modified transmission or power transfer means of Fig. 4 operates in connection with the remaining mechanism of Figs. 1 to 3 in the same manner as the power transfer means of Figs. 1 to 3. It will be noted that the driven lug 76 is located less than half the distance from the pivot 77, as compared with the driven lug 75, thus providing for rapid reversing movement of the shutter blade.

It is evident that it is within the scope of the invention to use a plurality of power sources with each individual shutter blade in place of the single source shown. The control of such additional power sources could be accomplished, for example, by means of a shutter speed adjusting ring, as is known in the art.

It is essential to the invention that the drive of each individual shutter blade be effected by its own energy source and that the transmission of the stored energy to the respective shutter blades be possible without any checking by the power transmission systems associated with the other shutter blades. In addition it is possible for one and the same shutter to have its shutter blades move selectively in an independent manner or coupled together.

Also in accordance with the invention several shutter blades, for example two, could be arranged in a group, which group could be associated with a single power source, such as a spring. The connection of such individual shutter blades in a group can be effected by means known in the art, such as by link connectors.

While the invention has been shown and described in the preferred forms, it is obvious that many changes and modifications may be made without departing from the spirit of the invention as defined in the following claims.

I claim:

1. A photographic intra-lens shutter comprising a base plate having a light aperture, a plurality of shutter blades pivoted on said base plate to open and close said light aperture for an exposure, said blades having driving-connection means, a spring power member pivoted on said base plate for each of said shutter blades, a separate spring for each power member, to drive the same, a pair of driving stops on and movable with said power member, a two armed lever fulcrumed on said base plate for each of the shutter blades, one end of one arm of said lever being bifurcated, said bifurcated end being operatively engaged with the driving-connection means of the related shutter blade, and a pair of stops on and movable with the other arm of said lever and consecutively engaged respectively by the stops of said pair of driving stops on the related power member to be driven thereby ahead of said driving stops and thus oscillate said lever so as to open and close the related shutter blade during the power moment of the power member said other lever arm overlying at least a portion of said power member to position the respective stops for abutting engagement with each other.

2. A photographic intra-lens shutter as set forth in claim 1, wherein one of the stops on said power member has a sloped surface over which one of the stops on said lever slides into cooperative relation to said one stop on the power member.

3. A shutter mechanism comprising shutter blades, each of said blades having independent spring charged means for operating said blades in a continuous movement from shutter closed position through shutter open position and then to shutter closed position, a movable cocking ring, yieldable means normally urging the cocking ring into a retracted position, cooperative abutting cocking means on said ring and said spring charged members for moving each of said spring charged members into cocked position in response to the movement of the cocking ring against the action of said means urging said ring to retracted position, means for locking each of said spring charged members in cocked position, means urging the latter means into locking association with said spring charged members when the latter are in cocked position, means for locking said ring in driving connection with all said cocking means through said cooperative abutting means for operation of all of said spring charged means as a single unit, means for moving said means for locking said spring charged members in cocked position out of cocking connection therewith for simultaneous operation of all of said spring charged means while they are interconnected by said ring including manually operable release means, and means for alternately releasing said ring from driving connection with all of said spring charged members independently of and prior to release of said spring charged members from said means for locking said spring charged members in cocked position.

4. The shutter set forth in claim 3 wherein said means for locking said spring charged members in cocked position comprises a movable holding ring, lugs on said holding ring, noses on said spring charged members and yieldable means normally urging the holding ring lug into engagement with said noses when the latter are in cocked position.

5. The shutter of claim 3 wherein said means for locking said cocking ring in driving connection with said spring charged members comprises a spring actuated pawl pivotally mounted on said cocking means, and a pin on one of said spring charged means, said pawl being movable into and out of engagement with said pin, and means operable by said manually operable means for moving said pawl out of engagement with said pin to enable said cocking ring to move to said retracted position.

6. A shutter as set forth in claim 3 including escapement means cooperating with said cocking ring operable to retard movement of the rocking ring into its retracted position, when said ring is in locked driving connection with all of said spring charged members.

7. The shutter of claim 3 wherein said means for moving said means for locking said spring charged means in cocked position out of locking connection with the spring charged members includes a spring charged device, means for cocking the said latter spring charged device including an element connected to said cocking ring and engageable with said spring charged device to effect cocking thereof when said cocking ring is moved to cock said spring charged members, means for latching said spring charged device in cocked position and automatically operable to latch said device when it is cocked, means on said manually operable release means engageable with the latter latching means to release said spring charged device and effect driving movement of said means for locking said spring charged members out of locking connection with the latter means.

8. The shutter of claim 3 including said means for releasing said driving connection between said cocking ring and said spring charged members, comprising a lever, means resiliently drivingly connecting said lever to said manually operable release means for operation by the latter means, and means for locking said lever to prevent movement thereof, said resilient means being deformable upon operation of said manually operable release means to release said spring charged members for simultaneous operation of said spring charged members when said lever is locked.

References Cited in the file of this patent

UNITED STATES PATENTS

| | | |
|---|---|---|
| 1,861,257 | Barenyi | May 31, 1932 |
| 1,865,078 | Barenyi | June 28, 1932 |
| 2,410,649 | Fuerst | Nov. 5, 1946 |
| 2,463,206 | Robertson | Mar. 1, 1949 |